(12) United States Patent
Gong et al.

(10) Patent No.: US 8,369,303 B2
(45) Date of Patent: *Feb. 5, 2013

(54) TECHNIQUES FOR UPLINK MULTI-USER MIMO MAC SUPPORT

(75) Inventors: Michelle X. Gong, Sunnyvale, CA (US); Eldad Perahia, Hillsboro, OR (US); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 322 days.

This patent is subject to a terminal disclaimer.

(21) Appl. No.: 12/845,395

(22) Filed: Jul. 28, 2010

(65) Prior Publication Data

US 2012/0026928 A1    Feb. 2, 2012

(51) Int. Cl.
   *H04B 7/04*        (2006.01)
   *H04W 80/02*     (2009.01)
(52) U.S. Cl. .................................... 370/345; 370/349
(58) Field of Classification Search .................. 370/345, 370/349

See application file for complete search history.

(56) References Cited

U.S. PATENT DOCUMENTS

| | | | |
|---|---|---|---|
| 2009/0117929 A1 | 5/2009 | Shuai | |
| 2009/0232510 A1 | 9/2009 | Gupta et al. | |
| 2011/0058598 A1* | 3/2011 | Gaur | 375/233 |
| 2011/0235593 A1* | 9/2011 | Gong et al. | 370/329 |
| 2011/0268094 A1* | 11/2011 | Gong et al. | 370/338 |
| 2012/0060075 A1* | 3/2012 | Gong et al. | 714/776 |

OTHER PUBLICATIONS

Richard van Nee, 'Strawmodel 802.11ac Specification Framework', Sep. 22, 2009, Qualcomm, IEEE802.11-09/0633r1, pp. 1-17.*
International Search Report and Written Opinion Received for PCT Application No. PCT/US2011/044217, mailed on Feb. 9, 2012, 9 pages.

* cited by examiner

*Primary Examiner* — Melvin Marcelo
(74) *Attorney, Agent, or Firm* — Ellis B. Ramirez

(57) ABSTRACT

An embodiment of the present invention provides a wireless station (STA), comprising a transceiver operable for communicating in a wireless network, wherein the transceiver is adapted for Uplink Multi-User Multiple Input Multiple Output (UL MU MIMO) Medium Access Control (MAC) support.

17 Claims, 2 Drawing Sheets

FIG. 1

| 105 | 110 | 115 | 120 | 125 | 130 | 135 | 140 | 150 |
|---|---|---|---|---|---|---|---|---|
| MULTICAST MAC ADDRESS | TOTAL # OF STREAMS | MAX DURATION | AID1 | MAX MCS FOR AID1 | STREAM BITMAP (OPTIONAL) | ... AIDn | MAX MCS FOR AIDn | STREAM BITMAP (OPTIONAL) |

| 205 | 210 | 215 | 220 | 225 | 230 | 235 | 240 |
|---|---|---|---|---|---|---|---|
| TOTAL # OF STREAMS | MAX DURATION | AID1 | MAX MCS FOR AID1 | STREAM BITMAP (OPTIONAL) | ... AIDn | MAX MCS FOR AIDn | STREAM BITMAP (OPTIONAL) |

200

TECHNIQUES FOR UPLINK MULTI-USER MIMO MAC SUPPORT

BACKGROUND

It is possible to increase the network capacity of a basic service set (BSS) using Uplink (UL) Multi-user Multiple Input, Multiple Output (MU MIMO). With UL MU MIMO, multiple STAs are permitted to simultaneously (in time and frequency) transmit to a multiple-antenna access point (AP) and the resulting signals are separated by the AP's MIMO equalizer. Long training fields (LTFs) are used within preambles for channel estimation. With UL MU MIMO, long training fields (LTFs) sent from different STAs should form an orthogonal matrix such that the AP can differentiate them. STAs need to know how to form their preambles such that the combination of LTFs from different STAs at the AP can be differentiated. It is possible to increase the network capacity of a basic service set (BSS) using Uplink (UL) Multi-user, Multiple Input, Multiple Output (MU MIMO).

With UL MU MIMO, multiple STAs are permitted to simultaneously (in time and frequency) transmit to a multiple-antenna AP and the resulting signals are separated by the AP's MIMO equalizer. Long training fields (LTFs) are used within preambles for channel estimation. With UL MU MIMO, long training fields (LTFs) sent from different STAs should form an orthogonal matrix such that the AP can differentiate them. STAs need to know how to form their preambles such that the combination of LTFs from different STAs at the AP can be differentiated.

Thus, a strong need exists for systems, apparatus and methods to improve UL MU MIMO techniques.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 illustrates an example frame format of an UL MU MIMO group action frame according to embodiments of the present invention; and FIG. 2 illustrates an example frame format of an UL MU MIMO frame according to embodiments of the present invention.

Figure 3:
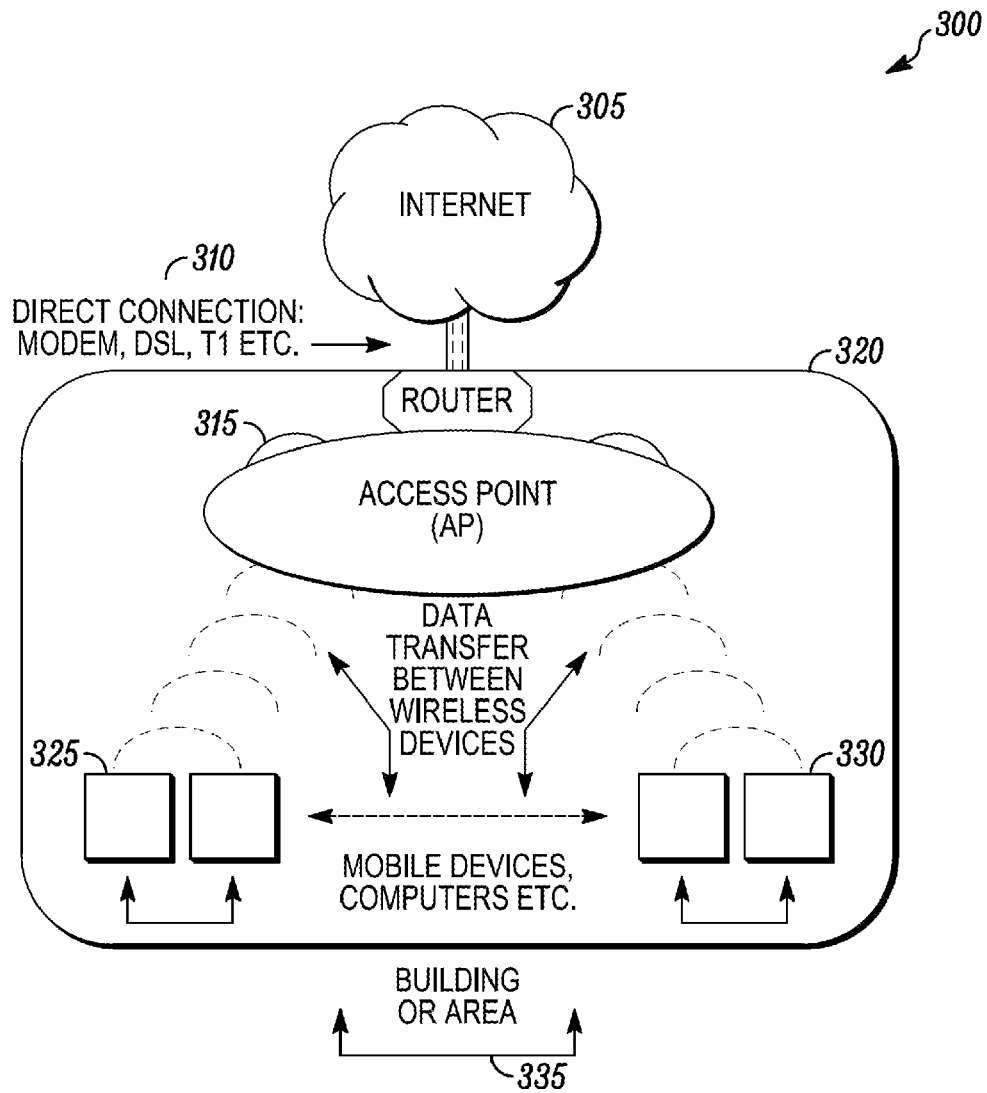
FIG. 3 illustrates an example system according to embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide using medium access control (MAC) signaling to notify different stations (STAs) operating in a wireless network regarding multicast address, total number of streams, individual MCS and the rows of the P matrix. In an embodiment of the present invention, an AP may determine the total number of streams, max duration and the max modulation coding scheme (MCSs) for individual STAs; may define a UL MU MIMO Group frame; and may provide a MAC signaling procedure before UL MU MIMO transmissions.

The signal to noise ratio (SNR) requirement of a stream within an UL MU MIMO transmission from multiple STAs received by an AP can be different from the SNR requirement of a single stream within a single transmission by a single STA. Because each individual STA does not know how many STAs will be transmitting in the same up link (UL) MU MIMO transmission, the AP must determine the number of STAs involved in the same UL MU MIMO transmission, the maximum duration of a STA's UL MU MIMO transmission, and the maximum number of streams (or some equivalent choice such as an MCS number that indicates the maximum number of streams) for each STA's transmission.

The AP learns the buffered traffic at each STA via the quality of service (QoS) control field in received frames. Before each UL MU MIMO transmission, the AP transmits an action frame to multiple STAs that have buffered traffic.

Turning now to FIG. 1, shown generally as 100, illustrates an example frame format of an UL MU MIMO group action frame according to embodiments of the present invention and may contain the multicast MAC address 105 assigned to the UL MU MIMO group, the total number of streams 110 within an UL MU MIMO transmission, the max duration 115 of the A-MPDUs contained in the UL MU MIMO transmission, association IDs (AIDs) 120, 140 of STAs in the group, the MCS 125, 140 for each STA in the group, and optionally a stream bitmap field 130, 150. Note that all STAs in the UL MU MIMO group need to know the max duration of the UL MU MIMO transmission such that: 1) they can put the max duration in the L-SIG field; and 2) optionally they can provide padding bits to pad shorter packets up to the longest duration.

Looking at FIG. 2, shown generally as 200, is an illustration of an example frame format of an UL MU MIMO frame according to embodiments of the present invention and may contain the total number of streams 205 within an UL MU MIMO transmission, the max duration 210 of the A-MPDUs contained in the UL MU MIMO transmission, association IDs (AIDs) 215, 230 of STAs in the group, the MCS 220, 235 for each STA in the group, and optionally a stream bitmap field 225, 240.

Each preamble contains one or more long training fields. One LTF is transmitted for each spatial stream, except in some designs where the next power of 2 number of LTFs are transmitted. The LTF sequences are multiplied by a value (1 or −1) from the orthogonal mapping P matrix.

$$P = \begin{pmatrix} 1 & -1 & 1 & 1 \\ 1 & 1 & -1 & 1 \\ 1 & 1 & 1 & -1 \\ -1 & 1 & 1 & 1 \end{pmatrix}$$

In one illustrative example, and not by way of limitation, three STAs are transmitting simultaneously in one UL MU MIMO transmission. The AP determines the MCS that each STA can use; for instance, the first two STAs transmit one spatial stream and the third STA transmits two spatial streams. In this case, the first row of the P matrix is assigned to STA1, the second row is assigned to STA2, and the last two rows are assigned to STA3. Upon receiving the UL MU MIMO Group frame, a STA would know which P matrix to use based on the total number of streams and which row(s) of the P matrix to use based on its assigned MCS and the MCSs assigned to the STAs in front of it.

The order of AIDs corresponds to the sequential order of assigned rows in the P matrix. The optional Stream Bitmap field can be used to directly notify a STA regarding which rows in the P matrix are applicable to that STA. The length of the stream bitmap field is the length of the maximum dimension of the P matrix. Upon receiving the Stream Bitmap field, a STA does not need to calculate the rows that it needs to use based on MCSs assigned to STAs in front of it. Instead, the rows assigned to the STA are directly indicated. In one embodiment, the UL MU MIMO Group action frame is transmitted in a unicast fashion to each STA in the UL MU MIMO group. In this case, before the UL MU MIMO transmission, the AP transmits a CF-Poll frame to the multi-cast address. Upon receiving the CF-Poll frame, all STAs belonging to the UL MU MIMO group will start transmitting. The AP will process the preambles from all STAs based on the information included in the UL MU MIMO group action frame. In another embodiment, the UL MU MIMO Group frame is a broadcast frame. All STAs that receive the frame and see their AIDs indicated in the frame will send back their data frames.

Turning now to FIG. 3, at 300, is illustrated another embodiment of the present invention which provides system, comprising a transceiver associated with a mobile device (325 or 330) operable to communicate in a wireless network 340 that may be located in a specific area or building 335. The mobile devices may be in communication with access point 315 with an associated transceiver, which may be connected to the Internet 305 via, for example, a T−1 line 310. The AP and STAs may be operating as part of the same basic service set (BSS) 320. The transceivers associated with the AP and STA may operate according to the techniques outlined above.

Still another embodiment of the present invention provides a computer readable medium encoded with computer executable instructions, which when accessed, cause a machine to perform operations comprising operating a transceiver in a wireless network which is adapted for Uplink Multi-User Multiple Input Multiple Output (UL MU MIMO) Medium Access Control (MAC) support. The computer readable medium may further implement the techniques set forth above.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A wireless station (STA), comprising:
   a transceiver operable for communicating in a wireless network, wherein said transceiver is adapted for Uplink Multi-User Multiple Input Multiple Output (UL MU MIMO) Medium Access Control (MAC) support;
   wherein said transceiver is further adapted for communication with an access point (AP) in a basic service set (BSS) in said wireless network and wherein said AP is capable of using MAC signaling to notify different STAs in said BSS regarding multicast address, total number of streams, individual Modulation Coding Scheme (MCS) and rows of a P matrix.

2. The wireless station of claim 1, wherein an UL MU MIMO Group action frame is transmitted in a unicast fashion to each STA in a UL MU MIMO group and wherein prior to an UL MU MIMO transmission, said AP transmits a CF-Poll frame to a multi-cast address and upon receiving said CF-Poll frame, all STAs belonging to said UL MU MIMO group will start transmitting and wherein said AP will process preambles from all STAs based on information included in said UL MU MIMO group action frame.

3. The wireless station of claim 2, wherein said UL MU MIMO Group frame is a broadcast frame and all STAs that receive a frame and see their AIDs indicated in said frame will send back their data frames.

4. The wireless station of claim 1, wherein said wireless network conforms to the Institute for Electronic and Electrical Engineers (IEEE) 802.11 standard.

5. The wireless station of claim 2, wherein said AP learns of buffered traffic at each STA via a QoS control field in received frames and prior to each UL MU MIMO transmission, said AP transmits said action frame to multiple STAs that have buffered traffic.

6. The wireless station of claim 5, wherein said action frame contains a multicast MAC address assigned to said UL MU MIMO group, a total number of streams within an UL MU MIMO transmission, a max duration of A-MPDUs contained in said UL MU MIMO transmission, association IDs of STAs in said group, an MCS for each STA in said group, and optionally a stream bitmap field.

7. A method comprising:
   operating a transceiver in a wireless network and adapting said transceiver to communicate in a wireless network, wherein said transceiver is adapted for Uplink Multi-User Multiple Input Multiple Output (UL MU MIMO) Medium Access Control (MAC) support;
   wherein said transceiver is further adapted for communication with an access point (AP) in a basic service set (BSS) in said wireless network and wherein said AP is capable of using MAC signaling to notify different STAs in said BSS regarding multicast address, total number of streams, individual Modulation Coding Scheme (MCS) and rows of a P matrix.

8. The method of claim 7, wherein an UL MU MIMO Group action frame is transmitted in a unicast fashion to each STA in a UL MU MIMO group and wherein prior to an UL MU MIMO transmission, said AP transmits a CF-Poll frame to a multi-cast address and upon receiving said CF-Poll frame, all STAs belonging to said UL MU MIMO group will start transmitting and wherein said AP will process preambles from all STAs based on information included in said UL MU MIMO group action frame.

9. The method of claim 8, wherein said UL MU MIMO Group frame is a broadcast frame and all STAs that receive a frame and see their authority identities (AIDs) indicated in said frame will send back their data frames.

10. The method of claim 7, wherein said wireless network conforms to the Institute for Electronic and Electrical Engineers (IEEE) 802.11 standard.

11. The method of claim 8, wherein said AP learns of buffered traffic at each STA via a QoS control field in received frames and prior to each UL MU MIMO transmission, said AP transmits said action frame to multiple STAs that have buffered traffic.

12. The method of claim 11, wherein said action frame contains a multicast MAC address assigned to said UL MU MIMO group, a total number of streams within an UL MU MIMO transmission, a max duration of A-MPDUs contained in said UL MU MIMO transmission, association IDs of STAs in said group, an MCS for each STA in said group, and optionally a stream bitmap field.

13. An access point (AP), comprising:
  a transceiver adapted for communication with a wireless station (STA) in a wireless network, said STA is adapted for Uplink Multi-User Multiple Input Multiple Output (UL MU MIMO) Medium Access Control (MAC) support;
  wherein said communication between said AP and said STA is within a basic service set (BSS) in said wireless network and wherein said AP is capable of using MAC signaling to notify different STAs in said BSS regarding multicast address, total number of streams, individual Modulation Coding Scheme (MCS) and rows of a P matrix.

14. The AP of claim 13, wherein an UL MU MIMO Group action frame is transmitted in a unicast fashion to each STA in a UL MU MIMO group and wherein prior to an UL MU MIMO transmission, said AP transmits a CF-Poll frame to a multi-cast address and upon receiving said CF-Poll frame, all STAs belonging to said UL MU MIMO group will start transmitting and wherein said AP will process preambles from all STAs based on information included in said UL MU MIMO group action frame.

15. The AP of claim 14, wherein said UL MU MIMO Group frame is a broadcast frame and all STAs that receive a frame and see their authority identities (AIDs) indicated in said frame will send back their data frames.

16. A non-transitory computer readable medium encoded with computer executable instructions, which when accessed, cause a machine to perform operations comprising:
  operating a transceiver in a wireless network which is adapted for Uplink Multi-User Multiple Input Multiple Output (UL MU MIMO) Medium Access Control (MAC) support;
  wherein said transceiver is further adapted for communication with an access point (AP) in a basic service set (BSS) in said wireless network and wherein said AP is capable of using MAC signaling to notify different STAs in said BSS regarding multicast address, total number of streams, individual Modulation Coding Scheme (MCS) and rows of a P matrix.

17. The non-transitory computer readable medium encoded with computer executable instructions of claim 16, wherein an UL MU MIMO Group action frame is transmitted in a unicast fashion to each STA in a UL MU MIMO group and wherein prior to an UL MU MIMO transmission, said AP transmits a CF-Poll frame to a multi-cast address and upon receiving said CF-Poll frame, all STAs belonging to said UL MU MIMO group will start transmitting and wherein said AP will process preambles from all STAs based on information included in said UL MU MIMO group action frame.

* * * * *